United States Patent
Farrugia et al.

(10) Patent No.: US 11,801,617 B2
(45) Date of Patent: *Oct. 31, 2023

(54) OPTICAL ABSORBING THERMOPLASTIC POLYMER PARTICLES AND METHODS OF PRODUCTION AND USES THEREOF

(71) Applicant: Xerox Corporation, Norwalk, CT (US)

(72) Inventors: Valerie M. Farrugia, Oakville (CA); Mihaela Maria Birau, Hamilton (CA)

(73) Assignee: Xerox Corporation, Norwalk, CT (US)

(*) Notice: Subject to any disclaimer, the term of this patent is extended or adjusted under 35 U.S.C. 154(b) by 418 days.

This patent is subject to a terminal disclaimer.

(21) Appl. No.: 16/916,222

(22) Filed: Jun. 30, 2020

(65) Prior Publication Data

US 2021/0069935 A1 Mar. 11, 2021

Related U.S. Application Data

(60) Provisional application No. 62/897,534, filed on Sep. 9, 2019.

(51) Int. Cl.
| | | |
|---|---|---|
| B29B 9/12 | (2006.01) | |
| C08K 5/00 | (2006.01) | |
| C08L 77/00 | (2006.01) | |
| C08J 3/14 | (2006.01) | |
| C08J 3/215 | (2006.01) | |
| B29B 9/16 | (2006.01) | |

(52) U.S. Cl.
CPC ............... *B29B 9/12* (2013.01); *B29B 9/16* (2013.01); *C08J 3/14* (2013.01); *C08J 3/215* (2013.01); *C08K 5/005* (2013.01); *C08K 5/0041* (2013.01); *C08L 77/00* (2013.01); *B29B 2009/125* (2013.01); *C08J 2377/02* (2013.01); *C08K 2201/011* (2013.01)

(58) Field of Classification Search
CPC .................. C08K 5/0041; B29B 9/12
See application file for complete search history.

(56) References Cited

U.S. PATENT DOCUMENTS

| | | | |
|---|---|---|---|
| 3,035,003 A | 5/1962 | Ferdinand | |
| 4,863,646 A * | 9/1989 | Watanabe | C08J 3/12 264/9 |
| 5,859,075 A | 1/1999 | Shukla et al. | |
| 7,740,938 B2 | 6/2010 | Helft et al. | |
| 8,822,555 B2 | 9/2014 | Kaiso et al. | |
| 10,655,025 B2 | 5/2020 | Farrugia et al. | |
| 2002/0128356 A1 * | 9/2002 | Nakamura | B01J 2/02 523/160 |
| 2010/0266949 A1 | 10/2010 | Lai | |
| 2011/0229545 A1 * | 9/2011 | Shum | B01F 23/41 977/773 |
| 2015/0152214 A1 | 6/2015 | Uenlue | |
| 2016/0375676 A1 | 12/2016 | Ritchie et al. | |
| 2017/0129177 A1 | 5/2017 | Hättig et al. | |
| 2019/0022930 A1 | 1/2019 | Hinch et al. | |
| 2019/0039294 A1 * | 2/2019 | Stasiak | C09D 7/61 |
| 2020/0048481 A1 * | 2/2020 | Pai-Paranjape | C09D 11/102 |
| 2021/0070988 A1 * | 3/2021 | Claridge | C08J 7/065 |
| 2021/0070993 A1 * | 3/2021 | Farrugia | B29C 64/153 |
| 2021/0139685 A1 * | 5/2021 | Herschke | B29C 64/165 |

FOREIGN PATENT DOCUMENTS

| | | |
|---|---|---|
| CN | 104194326 A | 12/2014 |
| EP | 0 866 088 A | 9/1998 |
| FR | 2939075 A1 | 6/2010 |
| JP | 2002080629 A | 3/2002 |
| WO | 2015/109143 A | 7/2015 |

OTHER PUBLICATIONS

H. Patil, et al. Hot-melt extrusion: from theory to application in pharmaceutical applicaitons, AAPS PharmSciTech, vol. 17, No. 1, pp. 20-42, Feb. 2016.
J. Sundararaj, et al. Drop breakup and coalescence in polymer blends: the effects of concentration and compatibilization, Macromolecules 1995, 28, 2647-2657.
R G Kleijnen, et al., Production and Processing of a Spherical Polybutylene Terephthalate Powder for Laser Sintering, Appl. Sci. 2019, 9(7), 1308.
I. Pillin, et al. Crystallization kinetics of poly(butylene terephthalate) (PBT): Influence of additives and free carboxylic acid chain ends. Polym. Eng. Sci. 2001, 41, 178-191.
S Fanselow, et al. AIP Conference Proceedings 1713, 140007 (2016)—Production of micron-sized polymer particles for additive manufacturing by melt emulsification.
M Schmid, et al., AIP Conference Proceedings 1664, 160009 (2015)—Polymer powders for selective laser sintering (SLS).
M Schmid, et al., Additive Manufacturing: Polymers Applicable for Laser Sintering (LS), Procedia Engineering 149 (2016) 457-464.
Marius Sachs et al; "Characterization of a downer reactor for particle rounding;" Powder Technology vol. 316, Jul. 1, 2017.
EP office action for related matter 20193756.2 dated Jan. 29, 2021.

* cited by examiner

*Primary Examiner* — Liam J Heincer
(74) *Attorney, Agent, or Firm* — Vorys, Sater, Seymour, and Pease LLP

(57) ABSTRACT

Optical absorber-containing thermoplastic polymer particles (OACTP particles) may be produced by methods that comprise: mixing a mixture comprising a thermoplastic polymer, a carrier fluid that is immiscible with the thermoplastic polymer, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising the thermoplastic polymer; separating the solidified particles from the carrier fluid; and exposing the solidified particles to an optical absorber to produce the OACTP particles.

12 Claims, 1 Drawing Sheet

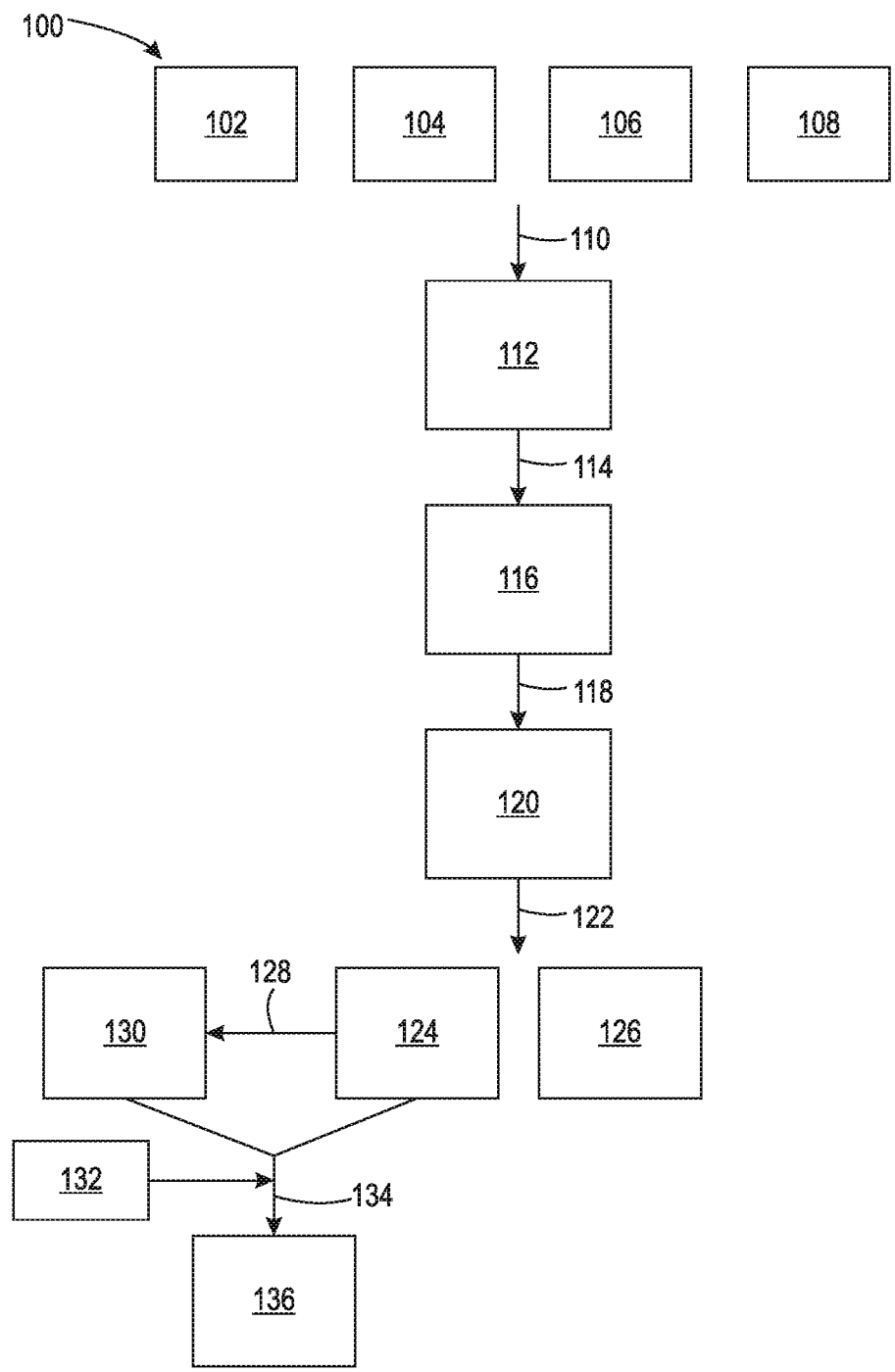

OPTICAL ABSORBING THERMOPLASTIC POLYMER PARTICLES AND METHODS OF PRODUCTION AND USES THEREOF

CROSS-REFERENCE TO RELATED APPLICATIONS

The present application claims the benefit of priority under 35 U.S.C. § 119 from U.S. Provisional Patent Application 62/897,534, filed on Sep. 9, 2019 and incorporated herein by reference in its entirety.

TECHNICAL FIELD

The present disclosure relates to thermoplastic polymer particles that include optical absorbing molecules. The present disclosure relates to the methods of making and using such particles.

BACKGROUND

Counterfeiting and forgery are among the greatest concerns in the consumer marketplace and the modern global economy. The International Chamber of Commerce estimates that counterfeiting will account for about $4.2 trillion of the global economy in 2022.

Anti-counterfeiting measures can include holograms and inscriptions to provide for product authentication. However, these measures are typically utilized as additions to the packaging of goods rather than incorporating directly into the goods.

SUMMARY OF THE INVENTION

The present disclosure relates to thermoplastic polymer particles that include optical absorbing molecules like chromophores and/or fluorophores. The present disclosure relates to the methods of making and using such particles. The particles described herein, especially the highly spherical thermoplastic polymer particles, may be useful, among other things, as starting material for additive manufacturing. Further, the optical absorber can be used for identifying objects, tracking objects, authenticating objects, and/or determining the health of objects made from the optical absorber-containing thermoplastic polymer particles.

Disclosed herein are methods that comprise: mixing a mixture comprising a thermoplastic polymer, an carrier fluid that is immiscible with the thermoplastic polymer, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising the thermoplastic polymer; separating the solidified particles from the carrier fluid; and exposing the solidified particles to an optical absorber to produce optical absorber-containing thermoplastic polymer particles (OACTP particles).

Disclosed herein are methods that comprise: mixing a mixture comprising a thermoplastic polymer, a carrier fluid that is immiscible with the thermoplastic polymer, an optical absorber, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified OACTP particles comprising the thermoplastic polymer and the optical absorber; and separating the solidified OACTP particles from the carrier fluid.

Also disclosed herein are compositions that comprise: OACTP particles comprising a thermoplastic polymer and an optical absorber non-covalently bound to the thermoplastic polymer, wherein the particles have a circularity of about 0.90 to about 1.0.

Also disclosed herein are methods that comprise: depositing OACTP particles described herein optionally in combination with other thermoplastic polymer particles upon a surface in a specified shape; and once deposited, heating at least a portion of the particles to promote consolidation thereof and form a consolidated body.

Also disclosed herein are methods that comprise: extruding a filament comprising one or more OACTP-polyamides of the present disclosure (and optionally one or more other thermoplastic polymers and/or one or more compatibilizers) through an orifice, wherein the filament becomes a polymer melt upon extrusion; depositing the polymer melt as a first layer on a platform; cooling the layer; depositing an additional layer of the polymer melt on the first layer; cooling the additional layer; repeating depositing and cooling for at least one additional layer to produce a 3-D shape.

Also disclosed herein are methods that comprise: extruding a polymer melt comprising one or more OACTP-polyamides of the present disclosure (and optionally one or more other thermoplastic polymers and/or one or more compatibilizers) through an orifice to produce a film, a fiber (or a filament), particles, pellets, or the like.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

The FIGURE is a flow chart of a nonlimiting example method of the present disclosure.

DETAILED DESCRIPTION

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

The present disclosure relates to thermoplastic polymer particles that include optical absorbing molecules like chromophores and/or fluorophores. More specifically, the optical absorbers are non-covalently bound (e.g., bound by hydrogen bonding, ionic bonding, and/or pi-pi stacking for aromatic-containing polymers and fluorophores) to the polymer of the particles. Herein, thermoplastic polymer particles comprising optical absorbers non-covalently bound to the polymer of the particles are abbreviated as OACTP particles.

The particles described herein, especially the highly spherical thermoplastic polymer particles, may be useful, among other things, as starting material for additive manufacturing. Further, the optical absorber can be used for identifying objects, tracking objects, authenticating objects, and/or determining the health of objects made from the optical absorber-containing thermoplastic polymer particles.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "optical absorber" refers to a molecule or portion thereof that absorbs ultraviolet or visible light.

As used herein, the term "chromophore" refers to an optical absorber where the light absorption imparts color.

As used herein, the term "fluorophore" refers to an optical absorber that re-emits an absorbed photon at a different wavelength.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherences via hydrogen bonding and/or other mechanisms. However, chemical bonding may be occurring to some degree.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. As used herein, the term "D90" refers to a diameter at which 90% of the sample (on a volume basis unless otherwise specified) is comprised of particles having a diameter less than said diameter value.

As used herein, the terms "diameter span" and "span" and "span size" when referring to diameter provides an indication of the breadth of the particle size distribution and is calculated as (D90-D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instrument software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is CEA/P, where CEA is the circumference of a circle having the area equivalent to the area (A) of the actual particle.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

Optical Absorber-Containing Thermoplastic Polymer Particles (OACTP Particles) and Methods of Making The methods and compositions described herein relate to OACTP particles. The optical absorber in said particles is non-covalently bound (e.g., bound by hydrogen bonding, ionic bonding, and/or pi-pi stacking for aromatic-containing polymers and fluorophores) to the polymer. The optical absorber can be associated with the polymer during formation of the particles and/or after formation of the particles. The particles described herein (before and/or after incorporation of the optical absorber) are formed by melt emulsification. In one nonlimiting example method, the optical absorber and polymer can be mixed before and/or during melt emulsification. Without being limited by theory, it is believed that in such a method the optical absorber non-covalently binds to the polymer throughout the particle. Alternatively or in addition to the foregoing, particles can be formed by melt emulsification and then exposed to the optical absorber (e.g., soaking in and/or washing with an ethanol solution of the optical absorber). Without being limited by theory, it is believed that in such a method the optical absorber non-covalently binds to the polymer at or near the surface of the particle.

FIG. 1 is a flow chart of a nonlimiting example method 100 of the present disclosure. Thermoplastic polymer 102, carrier fluid 104, optionally emulsion stabilizer 106, and optionally optical absorber 108 are combined 110 to produce a mixture 112. The components 102, 104, 106, and 108 can be added in any order and include mixing and/or heating during the process of combining 110 the components 102, 104, 106, and 108.

The mixture 112 is then processed 114 by applying sufficiently high shear to the mixture 112 at a temperature greater than the melting point or softening temperature of the thermoplastic polymer 102 to form a melt emulsion 116. Because the temperature is above the melting point or softening temperature of the thermoplastic polymer 102, the thermoplastic polymer 102 becomes a polymer melt. The shear rate should be sufficient enough to disperse the polymer melt in the carrier fluid 104 as droplets (i.e., the polymer emulsion 116). Without being limited by theory, it is believed that, all other factors being the same, increasing shear should decrease the size of the droplets of the polymer melt in the carrier fluid 104. However, at some point there may be diminishing returns on increasing shear and decreasing droplet size or there may be disruptions to the droplet contents that decrease the quality of particles produced therefrom.

The melt emulsion 116 inside and/or outside the mixing vessel is then cooled 118 to solidify the polymer droplets into thermoplastic polymer particles (also referred to as solidified thermoplastic polymer particles). When the optical absorber 108 is included in the mixture 112, the thermoplastic polymer particles 124 are OACTP particles.

The cooled mixture 120 can then be treated 122 to isolate the thermoplastic polymer particles 124 from other components 126 (e.g., the carrier fluid 104, excess emulsion stabilizer 106, and the like) and wash or otherwise purify the thermoplastic polymer particles 124. The thermoplastic polymer particles 124 comprise (a) the thermoplastic polymer 102, (b) when included, optical absorber 108, and (c) when included, at least a portion of the emulsion stabilizer 106 coating the outer surface of the thermoplastic polymer particles 124. Emulsion stabilizers 106, or a portion thereof, may be deposited as a uniform coating on the thermoplastic polymer particles 124. In some instances, which may be dependent upon non-limiting factors such as the temperature (including cooling rate), the type of thermoplastic polymer 102, and the types and sizes of emulsion stabilizers 106, the nanoparticles of emulsion stabilizers 106 may become at least partially embedded within the outer surface of thermoplastic polymer particles 124 in the course of becoming associated therewith. Even without embedment taking place, at least the nanoparticles within emulsion stabilizers 106 may remain robustly associated with thermoplastic polymer particles 124 to facilitate their further use. In contrast, dry blending already formed thermoplastic polymer particulates (e.g., formed by cryogenic grinding or precipitation processes) with a flow aid like silica nanoparticles does not result in a robust, uniform coating of the flow aid upon the thermoplastic polymer particulates.

The thermoplastic polymer particles 124 can be further purified 128 (described in more detail below) to yield purified thermoplastic polymer particles 130. Whether the optical absorber 108 was include in the mixture 112 or not, optical absorber 132 can be applied 134 to the thermoplastic polymer particles 124/130 to yield OACTP particles 136.

This example method 100 illustrates including the optical absorber 108 in the mixture 112 and applying 134 another optical absorber 132 to the thermoplastic polymer particles 124/130 (which because of the inclusion of optical absorber 108 are OACTP particles). The optical absorber 108 and the additional optical absorber 132 may be the same or different compositions. In alternative methods not illustrated, only one of (a) including the optical absorber 108 in the mixture 112 and (b) applying 134 the optical absorber 132 to the thermoplastic polymer particles 124/130 may be performed.

The thermoplastic polymer 102 and carrier fluid 104 should be chosen such that at the various processing temperatures (e.g., from room temperature to process temperature) the thermoplastic polymer 102 and carrier fluid 104 are immiscible. An additional factor that may be considered is the differences in (e.g., a difference or a ratio of) viscosity at process temperature between the molten thermoplastic polymer 102 and the carrier fluid 104. The differences in viscosity may affect droplet breakup and particle size distribution. Without being limited by theory, it is believed that when the viscosities of the molten thermoplastic polymer 102 and the carrier fluid 104 are too similar, the circularity of the product as a whole may be reduced where the particles are more ovular and more elongated structures are observed.

The thermoplastic polymer 102 should include at least one polymer capable of non-covalently bonding (e.g., via hydrogen bonding, ionic bonding, and/or pi-pi stacking) to the optical absorber. Generally, such polymers include moieties like alcohol, ether, carboxylic acid, ester, amine, amide, fluoride, sulfoxide, aryl rings (in backbone and/or pendent from the backbone), and the like, and any combination thereof. Examples of thermoplastic polymers capable of non-covalently bonding to an optical absorber include, but are not limited to, polyamides, polyurethanes, polyacetals, polycarbonates, polyethylene terephthalates, polybutylene terephthalates, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth) acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polyisoprenes, styrenic block copolymers, polyacrylonitriles, silicones, and the like, and any combination thereof. Copolymers comprising one or more of the foregoing may also be used in the methods and systems of the present disclosure. For example, polyolefin (e.g., polyethylene, polypropylene) and/or polybutadiene as a copolymer with one or more of the foregoing examples of thermoplastic polymers capable of non-covalently bonding to an optical absorber.

Further, other thermoplastic polymers that do not participate in hydrogen bonding and/or ionic bonding with the optical absorber can be mixed with polymers that do. Examples of polymers that may be included in addition to thermoplastic polymers capable of hydrogen bonding and/or ionic bonding include, but are not limited to, polyolefin (e.g., polyethylene, polypropylene), polybutadiene, and the like, and any combination thereof.

The thermoplastic polymers in the compositions and methods of the present disclosure may be elastomeric or non-elastomeric. Some of the foregoing examples of other thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in the Handbook of Thermoplastic Elastomers, 2nd ed., B. M. Walker and C. P. Rader, eds., Van Nostrand Reinhold, N.Y., 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), semi-aromatic polyamide, aromatic polyamides (aramids), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. Examples of polyamide elastomers include, but are not limited to, polyesteramide, polyetheresteramide, polycarbonate-esteramide, and polyether-block-amide elastomers. Herein, a polyamide followed by a single number is a polyamide having that number of backbone carbons between each nitrogen. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis(phenylisocyanate)-alt-1,4-butanediol/di(propyl ene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy thermoplastic polymers when more than one thermoplastic polymer is used. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The thermoplastic polymers 102 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymers 102 may optionally comprise an additive. Typically, the additive would be present before addition of the thermoplastic polymers 102 to the mixture 112. Therefore, in the thermoplastic polymer melt droplets and resultant thermoplastic polymer particles, the additive is dispersed throughout the thermoplastic polymer. Accordingly, for clarity, this additive is referred to herein as an "internal additive." The internal additive may be blended with the thermoplastic polymer just prior to making the mixture 112 or well in advance.

When describing component amounts in the compositions described herein (e.g., the mixture 112 and thermoplastic polymer particles 124), a weight percent based on the thermoplastic polymer 102 not inclusive of the internal additive. For example, a composition comprising 1 wt % of emulsion stabilizer by weight of 100 g of a thermoplastic polymer 102 comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer 102. For example, the thermoplastic polymer 102 may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The thermoplastic polymer 102 may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the thermoplastic polymer 102 and carrier fluid 104 combined.

Suitable carrier fluids 104 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 104 comprises two or more of the foregoing, the carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 112 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the thermoplastic polymer 102 and carrier fluid 104 combined.

In some instances, the carrier fluid 104 may have a density of about 0.6 g/cm$^3$ to about 1.5 g/cm$^3$, and the thermoplastic polymer 102 has a density of about 0.7 g/cm$^3$ to about 1.7 g/cm$^3$, wherein the thermoplastic polymer has a density similar, lower, or higher than the density of the carrier fluid.

Optical absorbers 108/132 should be chosen that are capable of non-covalently bonding to the thermoplastic polymer 102. Further, if the optical absorber 108 is included in the mixture 112, then the optical absorber 108 should be sufficiently stable to not decompose at the processing 114 temperatures.

Optical absorbers 108/132 may be from known families including, but not limited to, rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, indigo dyes, thioindigo dyes, perinoine dyes, perylene dyes, isoindolene dyes, aromatic amino acids, flavins, derivatives of pyridoxyl, derivatives of chlorophyll, and the like, and any combination thereof. Examples of specific optical absorbers 108/132 include, but are not limited to, DPP derivatives (e.g., DPP-PhCO; DPP-PhCN; DPP-NaCO and DPP-NaCN); 9-aminoacridine; 9H-1,8-diazafluoren-9-one (DFO); 2-aminoacridone; resorufin (NSC 12097); calcein blue; fluorescein; 5(6)-carboxyfluorescein; 5(6)-carboxyfluorescein-N-hydroxysuccinimide ester; [9-(2-ethoxycarbonylphenyl)-6-(ethyl amino)-2,7-dimethylxanthen-3-ylidene]-ethylazanium chloride (also known as rhodamine 6G and Basic Red 1); [9-(2-carb oxyphenyl)-6-di ethyl amino-3-xanthenylidene]-diethylammonium chloride (also known as rhodamine 610 and Basic Violet 10); [6-(diethylamino)-9-(2-ethoxycarbonylphenyl)xanthen-3-ylidene]-diethylazanium chloride (also known as Basic Violet 11); N,N-diethyl-4-[(E)-2-(1,3,3-trimethylindol-1-ium-2-yl)ethenyl]aniline chloride (also known as Basic Violet 16); 7-(diethyl amino)-3-(1,3-dimethylbenzimidazol-3-ium-2-yl) chromen-2-one chloride (also known as Basic Yellow 40); 6-amino-2-(2,4-dimethylphenyl)benzo[de]isoquinoline-1,3-dione (also known as Solvent Yellow 44); 4-amino-N-2,4-xylyl-1,8-naphthalimide (also known as Solvent Yellow 135); pigment violet 19; 1,4-bis(4-tert-butylphenyl)-3-hydroxy-2H-pyrrolo[3,4-c]pyrrol-6-one (also known as Pigment Orange 73); 1,2-dihydroxyanthraquinone (also known as alizarin); carminic acid; 1,3-dihydroxyanthraquinone; 1,4-dihydroxyanthraquinone; 1-hydroxy-4-(p-tolylamino) anthraquinone (also known as oil violet and Solvent Violent 13); 1,8-dihydroxy-3-methoxy-6-methyl anthraquinone (also known as parietin); 1,2,5-trihydroxy-6-methyl anthracene-9,10-dione (also known as morindone); calcein (also known as flourexon); 6-carboxyfluorescein succinimidyl ester; 6-carboxyfluorescein (also known as 6-FAM); 2',7'-dichloro-3',6'-dihydroxy-3H-spiro[2-benzofuran-1,9'-xanthen]-3-one (also known as dichlorofluoresceine); fluorescein isothiocyanate; 4', 5 '-dibromofluorescein; 5(6)-carboxy-2',7'-dichlorofluorescein; 2-pyrenepropanoic acid; 2-perylenepropanoic acid; 3,9-perylenedicarboxylic acid; 4-dimethylaminobenzaldehyde; (9H-pyreno[4,5-d]imidazol-10-yl)-benzaldehyde; phenylalanine; tryptophan; tyrosine; unsubstituted metal phthalocyanine; aluminum phthalocyanine; aluminum polychlorophthalocyanine; antimony phthalocyanine; barium phthalocyanine; beryllium phthalocyanine; cadmium hexadecachloro phthalocyanine; cadmium phthalocyanine; calcium phthalocyanine; cerium phthalocyanine; chromium phthalocyanine; cobalt phthalocyanine; cobalt chlorophthalocyanine; copper 4-aminophthalocyanine; copper bromochlorophthalocyanine; copper 4-chlorophthalocyanine; copper 4-nitrophthalocyanine; copper phthalocyanine; copper polychlorophthalocyanine; deuteriometal phthalocyanine; dysprosium phthalocyanine; erbium phthalocyanine; europium phthalocyanine; gadolinium phthalocyanine; gallium phthalocyanine; germanium phthalocyanine; hafnium phthalocyanine; halogen substituted metalphthalocyanine; holmium phthalocyanine; indium phthalocyanine; iron phthalocyanine; iron polyhalophthalocyanine; lanthanum phthalocyanine; phenylphthalocyanine; lithium phthalocyanine; lutecium phthalocyanine; magnesium phthalocyanine; manganese phthalocyanine; mercury phthalocyanine; molybdenum phthalocyanine; neodymium phthalocyanine; nickel phthalocyanine; nickel polyhalophthalocyanine; osmium phthalocyanine; palladium phthalocyanine; palladium chlorophthalocyanine; alkoxymetalphthalocyanine; alkylaminometalphthalocyanine; alkylmercaptophthalocyanine; aralkylaminometalphthalocyanine; aryloxymetalphthalocyanine; arylmercaptophthalocyanine; copper phthalocyanine piperidine; cycloalkylaminometalphthalocyanine; dialkylaminometalphthalocyanine; diaralkylaminometalphthalocyanine; dicylcloalkylaminometalphthalocyanine; hexadecahydrometalphthalocyanine; imidomethylphthalocyanine; octaazametalphthalocyanine; tetraazametalphthalocyanine; tetra-4-acetylaminometalphthalocyanine; tetra-4-aminobenzoylmetalphthalocyanine; tetra-4-aminometalphthalocyanine; tetrachloromethylmetalphthalocyanine; tetradiazomethalphthalocyanine; tetra-4,4-dimethyloctaazametalphthalocyanine; tetra-4,5-diphenyloctaazametalphthalocyanine; tetra-(6-methylbenzothiazoyl)metalphthalocyanine; tetra-p-methylphenylaminometalphthalocyanine; tetramethylmetalphthalocyanine; tetra-naphthotriazolylmetalphthalocyanine; tetra-4-naphthylmetalphthalocyanine; tetra-4-nitrometalphthalocyanine; tetra-peri-naphthylene-4,5-octaazametalphthalocyanine; tetra-2,3-phenyleneoxidemetalphthalocyanine; tetra-4-phenyloctaazametalphthalocyanine; tetraphenylmetalphthalocyanine; tetrapyridylmetalphthalocyanine; tetra-4-trifluoromethylmercaptophthalocyanine; tetra-4-trifluoromethylmetalphthalocyanine; 4,5-thionaphtheneoctaazaphthalocyanine; platinum phthalocyanine; potassium phthalocyanine; rhodium phthalocyanine; samarium phthalocyanine; silver phthalocyanine; silicon phthalocyanine; sodium phthalocyanine; thorium phthalocyanine; thulium phthalocyanine; tin chlorophthalocyanine; tin phthalocyanine; titanium phthalocyanine; uranium phthalocyanine; vanadium phthalocyanine; vanadyl phthalocyanine; ytterbium phthalocyanine; zinc chlorophthalocyanine; zinc phthalocyanine; N-(9,10-dioxoanthracen-1-yl)-7-oxobenzo[e]perimidine-4-carboxamide (also known as Anthrapyrimidine Yellow and Pigment Yellow 108); 4-chloro-3-[(2Z)-2-[1-[5-chloro-4-[[(2Z)-2-[[2-chloro-5-[N-[2-(4-chlorophenoxy)-5-(trifluoromethyl)phenyl]-C-hydroxycarbonimidoyl]phenyl]hydrazinylidene]-3-oxobutanoyl]amino]-2-methylanilino]-1,3-dioxobutan-2-ylidene]hydrazinyl]-N-[2-(4-chlorophenoxy)-5-(trifluoromethyl)

phenyl]benzenecarboximidic acid (also known as Disazo Yellow GG and Pigment Yellow 128); 2,9-dimethyl-5,12-dihydroquinolino[2,3-b]acridine-7,14-dione (also known as Quinacridone Magenta Y and Pigment Red 122); (1Z,11Z,19Z,29Z)-2,11,20,29-tetraza-37,38,39,40-tetrazanidanonacyclo[28.6.1.1$^{3,10}$.1$^{12,19}$.1$^{21,28}$.0$^{4,9}$.0$^{13,18}$.0$^{22,27}$.0$^{31,36}$]tetraconta-1,3,5,7,9,11,13,15,17,19,21,23,25,27,29,31,33,35-octadecaene copper (also known as Phthalo Blue beta and Pigment Blue 15:3); (1Z,11Z,19Z,29Z)-2,11,20,29-tetraza-37,38,39,40-tetrazanidanonacyclo[28.6.1.1$^{3,10}$.1$^{12,19}$.1$^{21,28}$.0$^{4,9}$.0$^{13,18}$.0$^{22,27}$.0$^{31,36}$]tetraconta-1,3,5,7,9,11,13,15,17,19,21,23,25,27,29,31,33,35-octadecaene copper (also known as Phthalo Blue alpha and Pigment Blue 15:2); 2-[(3-carboxy-2-oxidonaphthalen-1-yl)diazenyl]-4-chloro-5-methylbenzenesulfonate calcium (also known as Permanent Red 2B (calcium) and Pigment Red 48:2); 2,9-dichloro-5,12-dihydroquinolino[2,3-b]acridine-7,14-dione (also known as Quinacridone Magenta B and Pigment Red 202); 4,5-dichloro-2-[[5-methyl-3-oxo-2-(3-sulfophenyl)-1H-pyrazol-4-yl]diazenyl]benzenesulfonic acid (also known as Yellow 183); 2-[[2-chloro-4-[3-chloro-4-[[1-(4-chloro-2,5-dimethoxyanilino)-1,3-dioxobutan-2-yl]diazenyl]phenyl]phenyl]diazenyl]-N-(4-chloro-2,5-dimethoxyphenyl)-3-oxobutanamide (also known as Diarylide Yellow and Pigment Yellow 83); 2-[(3-carboxy-2-oxidonaphthalen-1-yl)diazenyl]-4-chloro-5-methylbenzenesulfonate disodium (also known as Wachtung Red B and Pigment Red 48); 3,10,17,24-tetrazaoctacyclo[13.13.2.0$^{2,10}$.0$^{4,9}$.0$^{12,29}$.0$^{16,24}$.0$^{18,23}$.0$^{26,30}$]triaconta-1(29),2,4,6,8,12,14,16,18,20,22,26(30),27-tridecaene-11,25-dione (also known as Perinone Orange and Pigment Orange 43); 4,5,6,7-tetrachloro-3-[4-[(4,5,6,7-tetrachloro-3-oxoisoindol-1-ylidene)amino]phenyl]iminoisoindol-1-one (also known as Tetrachloroisoindolinone Yellow R and Pigment Yellow 110); 7,18-dioxaheptacyclo[14.6.2.2$^{2,5}$.0$^{3,12}$.0$^{4,9}$.0$^{13,23}$.0$^{20,24}$]hexacosa-1(23),2,4,9,11,13,15,20(24),21,25-decaene-6,8,17,19-tetrone (also known as Perylene Red Y and Pigment Red 224); 7,18-dimethyl-7,18-diazaheptacyclo[14.6.2.2$^{2,5}$.0$^{3,12}$.0$^{4,9}$.0$^{13,23}$.0$^{20,24}$]hexacosa-1(23),2,4,9,11,13,15,20(24),21,25-decaene-6,8,17,19-tetrone (also known as Perylene Maroon and Pigment Red 179); (2Z)-1,3,3-trimethyl-2-[(E)-3-(1,3,3-trimethylindol-1-ium-2-yl)prop-2-enylidene]indole chloride (also known as Basic Red 12); tricarbocyanine dyes; hemicyanine dyes; 2,4-dimethoxy-N-RE)-2-(1,3,3-trimethylindol-1-ium-2-yl)ethenyl]aniline chloride (also known as Basic Yellow 11), oxonol dyes; 4-[3-methyl-4-[(1E,3E,5Z)-5-[3-methyl-5-oxo-1-(4-sulfophenyl)pyrazol-4-ylidene]penta-1,3-dienyl]-5-oxo-4H-pyrazol-1-yl]benzenesulfonic acid (also known as Oxonol 805 Blue), styryl dyes; 17-(3-methoxypropyl)-11,16,18-trioxo-3,10,17-triazahexacyclo[13.6.2.0$^{2,1}$.0$^{4,9}$.0$^{12,22}$.0$^{19,23}$]tricosa-1(21),2,4,6,8,12(22),13,15(23),19-nonaene-20-carbonitrile (also known as Disperse Yellow 31); diarylmethine dyes; triarylmethine dyes; [4-[[4-(dimethylamino)phenyl]-phenylmethylidene]cyclohexa-2,5-dien-1-ylidene]-dimethylazanium chloride (also known as Basic Green 4 and malachite green); [4-[bis[4-(dimethylamino)phenyl]methylidene]cyclohexa-2,5-dien-1-ylidene]-dimethylazanium chloride (also known as Basic Violet 3 and crystal violet); aza-analog methine dyes; 4-methoxy-N-methyl-N-[(E)-(1,3,3-trimethylindol-1-ium-2-yl)methylideneamino]aniline methyl sulfate (also known as Basic Yellow 28), diazahemicyanine dyes; 4-[(2,4-dimethyl-1,2,4-triazol-4-ium-3-yl)diazenyl]-N,N-dimethylaniline methyl sulfate (also known as Basic Red 22); 2-[N-ethyl-4-[(6-methoxy-3-methyl-1,3-benzothiazol-3-ium-2-yl)diazenyl]anilino]ethanol methyl sulfate (also known as Basic Blue 41); methyl violet dyes; fuchsine dyes; 4-[(4-aminophenyl)-(4-iminocyclohexa-2,5-dien-1-ylidene)methyl]aniline hydrochloride (also known as Pararosaniline and Basic Red 9); phenol dyes; 3,3-bis(4-hydroxyphenyl)-2-benzofuran-1-one (also known as phenolphthalein); malachite green dyes; [4-[ethyl-[(3-sulfonatophenyl)methyl]amino]phenyl]-[4-[ethyl-[(3-sulfonatophenyl)methyl]azaniumylidene]cyclohexa-2,5-dien-1-ylidene]methyl]benzenesulfonate disodium (also known as Brilliant Blue FCF), Victoria blue dyes; [4-[bis[4-(dimethylamino)phenyl]methylidene]naphthalen-1-ylidene]-ethylazanium chloride (also known as Victoria blue R); xanthene dyes; 9, 10-anthraquinone; 1-nitroanthraquinone; anthraquinone-1-sulfonic acid; dinitroanthraquinone; 4,8-diamino-1,5-dihydroxy-9,10-dioxoanthracene-2-sulfonate sodium (also known as Acid Blue 43); 19,33-dichlorononacyclo[18.10.2.2$^{2,5}$.0$^{3,16}$.0$^{4,13}$.0$^{6,11}$.0$^{17,31}$.0$^{21,26}$.0$^{28,32}$]tetratriaconta-1(31),2(34),3(16),4(13),5(33),6,8,10,14,17,19,21,23,25,28(32),29-hexadecaene-12,27-dione (also known as Vat Violet 1); 1-amino-4-hydroxy-2-phenoxyanthracene-9,10-dione (also known as Disperse Red 60); N-(24-benzamido-6,13,19,26-tetraoxo-16-azaheptacyclo[15.12.0.0$^{2,15}$.0$^{5,14}$.0$^{7,12}$.0$^{18,27}$.0$^{20,25}$]nonacosa-1(17),2(15),3,5(14),7(12),8,10,18(27),20(25),21,23,28-dodecaen-8-yl)benzamide (also known as Vat Orange 15); hexacyclo[10.10.2.0$^{2,7}$.0$^{9,23}$.0$^{13,18}$.0$^{20,24}$]tetracosa-1(23),2,4,6,9,11,13,15,17,20(24),21-undecaene-8,19-dione (also known as Vat Yellow 4); 9,18-dibromohexacyclo[11.7.1.1$^{4,20}$.0$^{2,11}$.0$^{3,8}$.0$^{17,21}$]docosa-1(21),2,4,6,8,10,13,15,17,19-decaene-12,22-dione (also known as Vat Orange 3 and Pigment Red 168); 5-oxo-1-(4-sulfonatophenyl)-4-[(4-sulfonatophenyl)diazenyl]-4H-pyrazole-3-carboxylate trisodium (also known as tartrazine); 4-[[5-ethoxycarbonyl-3-oxo-2-(4-sulfonatophenyl)-1H-pyrazol-4-yl]diazenyl]naphthalene-1-sulfonate (also known as orange B); 5-chloro-2-hydroxy-3-[(3-methyl-5-oxo-1-phenyl-4H-pyrazol-4-yl)diazenyl]benzenesulfonate sodium (also known as mordant red 19); 2,5-dichloro-4-[3-methyl-5-oxo-4-[(4-sulfophenyl)diazenyl]-4H-pyrazol-1-yl]benzenesulfonic acid (also known as Yellow 2G); 2-quinolin-2-ylindene-1,3-dione (also known as Quinoline Yellow); Quinophthalone Orange; 2-(3-hydroxy-1H-indol-2-yl)indol-3-one (also known as indigo); 2-[(4-hydroxy-9,10-dioxoanthracen-1-yl)amino]-5-methylbenzenesulfonic acid sodium (also known as alizarin irisol r); 3,5,6,8-tetrahydroxy-1-methyl-9,10-dioxo-7-[3,4,5-trihydroxy-6-(hydroxymethyl)oxan-2-yl]anthracene-2-carboxylic acid (also known as carmine); 19,22-dioxadecacyclo[23.11.1.1$^{4,8}$.0$^{2,23}$.0$^{3,18}$.0$^{5,36}$.0$^{9,14}$.0$^{26,31}$.0$^{33,37}$.0$^{16,38}$]octatriaconta-1(37),2(23),3(18),4(38),5(36),7,9,11,13,15,20,25,27,29,31,33-hexadecaene-17,24-dione (also known as Vat Blue 16); dibromoanthanthrone; 2,20-dichloro-14,32-diethyl-18,36-dioxa-4,14,22,32-tetrazanonacyclo[19.15.0.0$^{3,19}$.0$^{5,17}$.0$^{7,15}$.0$^{8,13}$.0$^{23,35}$.0$^{25,33}$.0$^{26,31}$]hexatriaconta-1,3,5(17),6,8,10,12,15,19,21,23(35),24,26,28,30,33-hexadecaene (also known as Pigment violet 23); 2,11,20,29,37,38,39,40-octazanonacyclo[28.6.1.1$^{3,10}$.1$^{12,19}$.1$^{21,28}$.0$^{4,9}$.0$^{13,18}$.0$^{22,27}$.0$^{31,36}$]tetraconta-1(37),2,4,6,8,10(40),11,13,15,17,19(39),20,22,24,26,28(38),29,31,33,35-icosaene copper (also known as phthalocyanine Blue BN); 2,11,20,29,38,40-hexaza-37,39-diazanidanonacyclo[28.6.1.1$^{3,10}$.1$^{12,19}$.1$^{21,28}$.0$^{4,9}$.0$^{13,18}$.0$^{22,27}$.0$^{31,36}$]tetraconta-1(36),2,4(9),5,7,10(40),11,13,15,17,19,21(38),22(27),23,25,28,30,32,34-nonadecaene-6,24-disulfonate copper disodium (also known as Direct Blue 86); 30,34-dimethoxynonacyclo[18.10.2.2$^{2,5}$.0$^{3,16}$.0$^{4,13}$.0$^{6,11}$.0$^{17,31}$.0$^{22,27}$.0$^{28,32}$]tetratriaconta-1(30),2(34),3(16),4(13),5(33),6,8,10,14,17(31),18,20(32),22,24,26,28-hexadecaene-12,21-dione (also known as Vat Green 1);30-nitrononacyclo

[18.10.2.2$^{2,5}$.0$^{3,16}$.0$^{4,13}$.0$^{6,11}$.0$^{17,31}$.0$^{22,27}$.0$^{28,32}$]tetratriaconta-1(30),2,4,6,8,10,13,15,17(31),18,20(32),22,24,26,28, 33-hexadecaene-12,21-dione (also known as Vat Green 9); 7,18-bis(4-methoxyphenyl)-7,18-diazaheptacyclo[14.6. 2.2$^{2,5}$.0$^{3,12}$.0$^{4,9}$.0$^{13,23}$.0$^{20,24}$]hexacosa-1(23),2,4,9,11,13,15, 20(24),21,25-decaene-6,8,17,19-tetrone (also known as Pigment Red 190); 7,18-bis(3,5-dimethylphenyl)-7,18-diazaheptacyclo[14.6.2.2$^{2,5}$.0$^{3,12}$.0$^{4,9}$.0$^{13,23}$.0$^{20,24}$]hexacosa-1 (23),2,4,9,11,13,15,20(24),21,25-decaene-6,8,17,19-tetrone (also known as Pigment Red 149); 7,18-bis(4-phenyldiazenylphenyl)-7,18-diazaheptacyclo[14.6.2.2$^{2,5}$.0$^{3,12}$.0$^{4,9}$. 0$^{13,23}$.0$^{20,24}$]hexacosa-1(23),2,4,9,11,13,15,20(24),21,25-decaene-6,8,17,19-tetrone (also known as Pigment Red 178); 7,18-diazaheptacyclo[14.6.2.2$^{2,5}$.0$^{3,12}$.0$^{4,9}$.0$^{13,23}$. 0$^{20,24}$]hexacosa-1(23),2,4,9,11,13,15,20(24),21,25-decaene-6,8,17,19-tetrone (also known as Pigment Violet 29); 3-(1,3-benzothiazol-2-yl)-7-(diethylamino)chromen-2-one (also known as Coumarin 6); 3-(1H-benzimidazol-2-yl)-7-(di ethylamino)chromen-2-one (also known as Coumarin 7); 7-(diethylamino)-3-(1-methylbenzimidazol-2-yl)chromen-2-one (also known as Coumarin 30); and the like; and any combination thereof.

Preferably, the fluorophores used as optical absorbers 108/132 absorb electromagnetic radiation at a wavelength of 302 nm or less or 700 nm or greater and emit photoluminescence at a wavelength of 302 nm to 700 nm. However, other excitation and emission wavelengths are suitable.

When optical absorbers 132 are applied 134 to the particles 124/130, the optical absorbers 132 may be suspended and/or solubilized in a solvent. The solvent should be nonreactive (e.g., non-swelling and non-dissolving) with the thermoplastic polymer 102. Examples of solvents include, but are not limited to, water, methanol, ethanol, propanol, acetone, benzene, toluene, hexane, heptane, chloroform, and the like, and any miscible combination thereof.

The particles 124/130 may be exposed to the solvent suspended/solubilized optical absorber 132 for a suitable amount of time (e.g., about 1 minute to about 48 hours, or about 1 minute to about 6 hours, or about 1 hour to about 24 hours, or about 18 minutes to about 48 hours). Further, the exposure may be at any suitable temperature (e.g., about −10° C. to about 100° C., or about −10° C. to about 30° C., or about 10° C. to about 50° C., or about 50° C. to about 100° C.). Examples of exposure techniques include, but are not limited to, soaking, washing (e.g., passing the solvent suspended/solubilized optical absorber 132 over a wet cake of the particles 124/130 and/or passing the solvent suspended/solubilized optical absorber 132 through a column packed with the particles 124/130), spraying, and the like, and any combination thereof.

Alternatively, the optical absorber 132 applied 134 to the particles 124/130 may be a powder.

The OACTP particles of the present disclosure may include the optical absorber (or cumulative optical absorbers if more than one is used) at about 0.01 wt % to about 30 wt % (or about 0.01 wt % to about 1 wt %, or about 0.1 wt % to about 5 wt %, or about 1 wt % to about 10 wt %, or about 5 wt % to about 20 wt %, or about 10 wt % to about 30 wt %) of the thermoplastic polymer 102.

The OACTP particles may comprise one or more optical absorbers. The composition and concentration of the optical absorbers may be used for identifying objects, tracking objects, authenticating objects, and/or determining the health of objects made from the OACTP particles. That is, the optical absorbers may be used as a chemical fingerprint for identifying objects, tracking objects, and/or authenticating objects. Further or alternatively, the optical absorbers may be used as a chemical indicator for a portion of the object as a way of identifying defects (e.g., cracks or wear) and/or the extent of such defects.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

Nanoparticles may be included in the mixture 112 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the thermoplastic polymer 102.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 112 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 112 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added in any order and include mixing and/or heating during the process of combining 110 the components 102, 104, and 106. For example, the emulsion stabilizer 106 may first be dispersed in the carrier fluid 104, optionally with heating said dispersion, before adding the thermoplastic polymer 102. In another nonlimiting example, the thermoplastic polymer 102 may be heated to produce a polymer melt to which the carrier fluid 104 and emulsion stabilizer 106 are added together or in either order. In yet another nonlimiting example, the thermoplastic polymer 102 and carrier fluid 104 can be mixed at a temperature greater than the melting point or softening temperature of the thermoplastic polymer 102 and at a shear rate sufficient enough to disperse the thermoplastic polymer melt in the carrier fluid 104. Then, the emulsion stabilizer 106 can be added to form the mixture 112 and maintained at suitable process conditions for a set period of time.

Combining 110 the components 102, 104, and 106 in any combination can occur in a mixing apparatus used for the processing 114 and/or another suitable vessel. By way of nonlimiting example, the thermoplastic polymer 102 may be heated to a temperature greater than the melting point or softening temperature of the thermoplastic polymer 102 in the mixing apparatus used for the processing 114, and the emulsion stabilizer 106 may be dispersed in the carrier fluid 104 in another vessel. Then, said dispersion may be added to the melt of the thermoplastic polymer 102 in the mixing apparatus used for the processing 114.

The mixing apparatuses used for the processing 114 to produce the melt emulsion 116 should be capable of maintaining the melt emulsion 116 at a temperature greater than the melting point or softening temperature of the thermoplastic polymer 102 and applying a shear rate sufficient to disperse the polymer melt in the carrier fluid 104 as droplets.

Examples of mixing apparatuses used for the processing 114 to produce the melt emulsion 116 include, but are not limited to, extruders (e.g., continuous extruders, batch extruders, and the like), stirred reactors, blenders, reactors with inline homogenizer systems, and the like, and apparatuses derived therefrom.

Processing 114 and forming the melt emulsion 116 at suitable process conditions (e.g., temperature, shear rate, and the like) for a set period of time.

The temperature of processing 114 and forming the melt emulsion 116 should be a temperature greater than the melting point or softening temperature of the thermoplastic polymer 102 and less than the decomposition temperature of any components 102, 104, and 106 in the mixture 112. For example, the temperature of processing 114 and forming the melt emulsion 116 may be about 1° C. to about 50° C. (or about 1° C. to about 25° C., or about 5° C. to about 30° C., or about 20° C. to about 50° C.) greater than the melting point or softening temperature of the thermoplastic polymer 102 provided the temperature of processing 114 and forming the melt emulsion 116 is less than the decomposition temperature of any components 102, 104, and 106 in the mixture 112.

The shear rate of processing 114 and forming the melt emulsion 116 should be sufficiently high to disperse the polymer melt in the carrier fluid 104 as droplets. Said droplets should comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The time for maintaining said temperature and shear rate for processing 114 and forming the melt emulsion 116 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 114 can be stopped. That time may depend on, among other things, the temperature, shear rate, thermoplastic polymer 102 composition, the carrier fluid 104 composition, and the emulsion stabilizer 106 composition.

The melt emulsion 116 may then be cooled 118. Cooling 118 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 116. In some instances, the shear applied during heating may be applied during cooling.

The cooled mixture 120 resulting from cooling 118 the melt emulsion 116 comprises solidified thermoplastic polymer particles 124 (or simply thermoplastic polymer particles) and other components 126 (e.g., the carrier fluid 104, excess emulsion stabilizer 106, and the like). The thermoplastic polymer particles may be dispersed in the carrier fluid or settled in the carrier fluid.

The cooled mixture 120 may then be treated 122 to the separate thermoplastic polymer particles 124 (or simply thermoplastic polymer particles 124) from the other components 126. Suitable treatments include, but are not limited to, washing, filtering, centrifuging, decanting, and the like, and any combination thereof.

Solvents used for washing the thermoplastic polymer particles 124 should generally be (a) miscible with the carrier fluid 104 and (b) nonreactive (e.g., non-swelling and non-dissolving) with the thermoplastic polymer 102. The choice of solvent will depend on, among other things, the composition of the carrier fluid and the composition of the thermoplastic polymer 102.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the thermoplastic polymer particles 124 by drying using an appropriate method such as air-drying, heat-drying, reduced pressure drying, freeze drying, or a hybrid thereof. The heating may be performed preferably at a temperature lower than the glass transition point of the thermoplastic polymer (e.g., about 50° C. to about 150° C.).

Advantageously, carrier fluids and washing solvents of the systems and methods described herein (e.g., method 100) can be recycled and reused. One skilled in the art will recognize any necessary cleaning of used carrier fluid and solvent necessary in the recycling process.

The thermoplastic polymer particles 124 after separation from the other components 126 and/or after application 134 of the optical absorber 132 may optionally be further purified 128. As illustrated, purification 128 occurs before application 134 of the optical absorber 132 and yields purified thermoplastic polymer particles 130. For example, to narrow the particle size distribution (or reduce the diameter span), the thermoplastic polymer particles 124 (before and/or after application 134 of the optical absorber 132) can be passed through a sieve having a pore size of about 10 µm to about 250 µm (or about 10 µm to about 100 µm, or about 50 µm to about 200 µm, or about 150 µm to about 250 µm).

In another example purification technique, the thermoplastic polymer particles 124 (before and/or after application 134 of the optical absorber 132) may be washed with water to remove surfactant while maintaining substantially all of the nanoparticles associated with the surface of the thermoplastic polymer particles 124. In yet another example purification technique, the thermoplastic polymer particles 124 (before and/or after application 134 of the optical absorber 132) may be blended with additives to achieve a desired final product. For clarity, because such additives are blended with the thermoplastic particles 124 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the thermoplastic polymer particles 124 may be unwanted in downstream applications. Accordingly, yet another example purification technique may include at least substantial removal (before and/or after application 134 of the optical absorber 132) of the surfactant from the thermoplastic polymer particles 124 (e.g., by washing and/or pyrolysis).

The thermoplastic polymer particles 124 and/or purified thermoplastic polymer particles 130 and/or OACTP particles 136 (referred to as particles 124/130/136) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 124/130/136 is, in general when emulsion stabilizers are used, includes emulsion stabilizers (a) dispersed on an outer surface of the particles 124/130/136 and/or (b) embedded in an outer portion (e.g., outer 1 vol %) of the particles 124/130/136.

Further, where voids form inside the polymer melt droplets, emulsion stabilizers 106 should generally be at (and/or embedded in) the interface between the interior of the void and the thermoplastic polymer. The voids generally do not contain the thermoplastic polymer. Rather, the voids may contain, for example, carrier fluid, air, or be void. The particles 124/130/136 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 124/130/136.

The thermoplastic polymer 102 may be present in the particles 124/130/136 at about 90 wt % to about 99.5 wt % (or about 90 wt % to about 95 wt %, or about 92 wt % to about 97 wt %, or about 95 wt % to about 99.5 wt %) of the particles 124/130/136.

When included, the emulsion stabilizers 106 may be present in the particles 124/130/136 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 124/130/136. When purified to at least substantially remove surfactant or another emulsion stabilizer, the emulsion stabilizers 106 may be present in the particles 130/136 at less than 0.01 wt % (or 0 wt % to about 0.01 wt %, or 0 wt % to 0.001 wt %).

Upon forming thermoplastic particulates according to the disclosure herein using particulate emulsion stabilizers, at least a portion of the particulate emulsion stabilizers, such as silica nanoparticles, may be disposed as a coating upon the outer surface of the thermoplastic particulates. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 124/130/136. When purified to at least substantially remove surfactant or another emulsion stabilizer, the emulsion stabilizers 106 may be present in the particles 130/136 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 130/136. The coverage of the emulsion stabilizers 106 on an outer surface of the particles 124/130/136 may be determined using image analysis of the scanning electron microscope images (SEM micrographs). The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 124/130/136. When purified to at least substantially remove surfactant or another emulsion stabilizer, the emulsion stabilizers 106 may be present in the particles 130/136 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 130/136. The coverage of the emulsion stabilizers 106 on an outer surface of the particles 124/130/136 may be determined using image analysis of the SEM micrographs The particles 124/130/136 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D900. The particles 124/130/136 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow.

In a first nonlimiting example, the particles 124/130/136 may have a D10 of about 0.1 μm to about 10 μm, a D50 of about 0.5 μm to about 25 μm, and a D90 of about 3 μm to about 50 μm, wherein D10<D50<D90. Said particles 124/130/136 may have a diameter span of about 0.2 to about 2.

In a second nonlimiting example, the particles 124/130/136 may have a D10 of about 5 μm to about 30 μm, a D50 of about 30 μm to about 70 μm, and a D90 of about 70 μm to about 120 μm, wherein D10<D50<D90. Said particles 124/130/136 may have a diameter span of about 1.0 to about 2.5.

In a third nonlimiting example, the particles 124/130/136 may have a D10 of about 25 μm to about 60 μm, a D50 of about 60 μm to about 110 μm, and a D90 of about 110 μm to about 175 μm, wherein D10<D50<D90. Said particles 124/130/136 may have a diameter span of about 0.6 to about 1.5.

In a fourth nonlimiting example, the particles 124/130/136 may have a D10 of about 75 μm to about 125 μm, a D50 of about 100 μm to about 200 μm, and a D90 of about 125 μm to about 300 μm, wherein D10<D50<D90. Said particles 124/130/136 may have a diameter span of about 0.2 to about 1.2.

In a fifth nonlimiting example, the particles 124/130/136 may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 μm), and a D90 of about 60 μm to about 300 μm (or about 70 μm to about 200 μm, or about 60 μm to about 150 μm, or about 150 μm to about 300 μm), wherein D10<D50<D90. The particles 124/130/136 may also have a diameter span of about 0.4 to about 3 (or about 0.6 to about 2, or about 0.4 to about 1.5, or about 1 to about 3).

The particles 124/130/136 may have a circularity of about 0.9 or greater (or about 0.90 to about 1.0, or about 0.93 to about 0.99, or about 0.95 to about 0.99, or about 0.97 to about 0.99, or about 0.98 to 1.0).

The particles 124/130/136 may have an angle of repose of about 25° to about 45° (or about 25° to about 35°, or about 30° to about 40°, or about 35° to about 45°).

The particles 124/130/136 may have a Hausner ratio of about 1.0 to about 1.5 (or about 1.0 to about 1.2, or about 1.1 to about 1.3, or about 1.2 to about 1.35, or about 1.3 to about 1.5).

The particles 124/130/136 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 114 and the composition and relative concentrations of the components 102, 104, and 106, different shapes of the structures that compose the particles 124/130/136 have been observed. Typically, the particles 124/130/136 comprise substantially spherical particles (having a circularity of about 0.97 or greater). However, other structures including disc and elongated structures have been observed in the particles 124/130/136. Therefore, the particles 124/130/136 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 124/130/136 may have a sintering window that is within 10° C., preferably within 5° C., of the sintering window of the thermoplastic polymer.

Applications of OACTP-Polyamides

The OACTP-polyamides described herein may be used to produce a variety of objects (or articles). The OACTP-polyamides described herein may be used alone or in combination with other thermoplastic polymers (e.g., polyamides without an optical absorber and/or other thermoplastic polymers). Examples of thermoplastic polymers that may be used in conjunction with one or more OACTP-polyamides of the present disclosure include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or non-functionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems described herein.

If needed, compatibilizers may be used when combining the OACTP-polyamides described herein with other thermoplastic polymers. Compatibilizers may improve the blending efficiency and/or efficacy of the polymers. Examples of polymer compatibilizers include, but are not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

Methods for producing objects include, but are not limited to, melt extrusion, injection molding, compression molding, melt spinning, melt emulsification, spray drying (e.g., to form particles), cryogenic milling (or cryogenic grinding), freeze drying polymer dispersions, precipitation of polymer dispersions, and the like, and any hybrid thereof.

Examples of articles that may be produced by such methods where the OACTP-polyamide may be all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

In addition to the OACTP-polyamides described herein may have a specific chemical fingerprint that is useful in identifying objects, tracking objects, authenticating objects, and/or determining the health of objects. Further, the placement of where the OACTP-polyamides are located in the objects as another layer of fingerprinting the objects for identifying objects, tracking objects, authenticating objects, and/or determining the health of objects.

Methods of identifying objects, tracking objects, authenticating objects, and/or determining the health of objects may include (a) exposing the object comprising OACTP-polyamides to electromagnetic radiation (e.g., for fluorophores preferably at a wavelength of 302 nm or less or 700 nm or greater); (b) sensing one or more spectra related to the electromagnetic radiation absorbed and/or reemitted (e.g., for fluorophores preferably the photoluminescence emitted between 302 nm to 700 nm); and (c) comparing the spectra to the known spectra for the optical absorbers used in said object or portion thereof. Optionally, the location of where the spectra area is located on the object may be compared to the known location where the spectra area should be. The comparison(s) can be used for identifying and/or authenticating the object. For tracking, the comparison(s) may be done and/or the detected spectra and/or spectra area may be logged into a database along with the physical location of the object. Further, the health of objects that wear and/or crack can be ascertained. For example, a core portion of the article may comprise optical absorbers and an outer portion may cover the core portion and not comprise the optical absorbers (or comprise different optical absorbers). Then, when comparing spectra, the appearance of spectral features for the optical absorbers in the core may indicate that the object is at or near the end of life.

By way of nonlimiting example, 3-D printing processes of the present disclosure may comprise: depositing particles comprising one or more OACTP-polyamides of the present disclosure (and optionally one or more other thermoplastic polymers and/or one or more compatibilizers) upon a surface in a specified shape, and once deposited, heating at least a portion of the particles to promote consolidation thereof and form a consolidated body (or object), such that the consolidated body has a void percentage of about 1% or less after being consolidated. For example, heating and consolidation of the thermoplastic polymer particles may take place in a 3-D printing apparatus employing a laser, such that heating and consolidation take place by selective laser sintering.

By way of nonlimiting example, 3-D printing processes of the present disclosure may comprise: extruding a filament comprising one or more OACTP-polyamides of the present disclosure (and optionally one or more other thermoplastic polymers and/or one or more compatibilizers) through an orifice, wherein the filament becomes a polymer melt upon extrusion; depositing the polymer melt as a first layer on a platform; cooling the layer; depositing an additional layer of the polymer melt on the first layer; cooling the additional layer; repeating depositing and cooling for at least one additional layer to produce a 3-D shape.

Yet another nonlimiting example is a method comprising: extruding a polymer melt comprising one or more OACTP-polyamides of the present disclosure (and optionally one or more other thermoplastic polymers and/or one or more compatibilizers) through an orifice to produce a film, a fiber (or a filament), particles, pellets, or the like.

Example Embodiments

A first nonlimiting example embodiment is a method comprising: mixing a mixture comprising a thermoplastic polymer, an carrier fluid that is immiscible with the thermoplastic polymer, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising the thermoplastic polymer; separating the solidified particles from the carrier fluid; and exposing the solidified particles to an optical absorber to produce optical absorber-containing thermoplastic polymer particles (OACTP particles). Further, the optical absorber may be a first optical absorber, and the mixture further comprises a second optical absorber that is the same or different than the first optical absorber.

A second nonlimiting example embodiment is a method comprising: mixing a mixture comprising a thermoplastic polymer, an carrier fluid that is immiscible with the thermoplastic polymer, an optical absorber, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form a solidified optical absorber containing thermoplastic polymer particles (OACTP particles) comprising the thermoplastic polymer and the optical absorber; and separating the solidified OACTP particles from the carrier fluid.

The first and second example embodiments may optionally include one or more of: Element 1: wherein the OACTP particles comprise 0.01 wt % to 30 wt % of the optical absorber based on the weight of the thermoplastic polymer in the OACTP particles; Element 2: wherein the optical absorber is selected from the group consisting of: rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, indigo dyes, thioindigo dyes, perinone dyes, perylene dyes, isoindolene dyes, aromatic amino acids, flavins, derivatives of pyridoxyl, derivatives of chlorophyll, any combination thereof; Element 3: wherein the emulsion stabilizer is included in the mixture, and wherein the emulsion stabilizer comprises a surfactant and/or a nanoparticle; Element 4: Element 3 and wherein the emulsion stabilizer associated with an outer surface of the OACTP particles; Element 5: Element 3 and wherein the emulsion stabilizer is embedded in the outer surface; Element 6: wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or non-functionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof; Element 7: wherein at least some of the OACTP particles have a void comprising the emulsion stabilizer at a void/polymer interface; Element 8: Element 7 and wherein the emulsion stabilizer is included in the mixture, and wherein the emulsion stabilizer comprises nanoparticles and the nanoparticles are embedded in the void/polymer interface; Element 9: Element 7 and wherein the void contains the carrier fluid; Element 10: wherein the OACTP particles further comprises elongated structures on the surface of the OACTP particles, wherein the elongated structures comprises the thermoplastic polymer and, when included, the emulsion stabilizer associated with an outer surface of the elongated structures; Element 11: wherein the emulsion stabilizer is included in the mixture, and wherein the emulsion stabilizer is present and forms a coating that covers less than 5% of the surface of the OACTP particles; Element 12: wherein the emulsion stabilizer is included in the mixture, and wherein the emulsion stabilizer is present and forms a coating that covers at least 5% of the surface of the OACTP particles; Element 13: wherein the emulsion stabilizer is included in the mixture, and wherein the emulsion stabilizer is present and forms a coating that covers at least 25% of the surface of the OACTP particles; Element 14: wherein the emulsion stabilizer is included in the mixture, and wherein the emulsion stabilizer is present and forms a coating that covers at least 50% of the surface of the OACTP particles; Element 15: wherein the thermoplastic polymer is present in the mixture at 5 wt % to 60 wt % of the mixture; Element 16: wherein the emulsion stabilizer is included in the mixture, and wherein the emulsion stabilizer is present in the mixture at 0.05 wt % to 5 wt % by weight of the thermoplastic polymer; Element 17: wherein the emulsion stabilizer is included in the mixture, and wherein emulsion stabilizer comprises nanoparticles having an average diameter of 1 nm to 500 nm; Element 18: wherein the carrier fluid is selected from the group consisting of: silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof; Element 19: Element 18 and wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof; Element 20: wherein the carrier fluid has a viscosity at 25° C. of 1,000 cSt to 150,000 cSt; Element 21: wherein the carrier fluid has a density of 0.6 g/cm$^3$ to 1.5 g/cm$^3$; Element 22: wherein mixing occurs in an extruder; Element 23: wherein mixing occurs in a stirred reactor; Element 24: wherein the emulsion stabilizer comprises a surfactant; Element 25: wherein the OACTP particles have a D10 of about 0.1 µm to about 125 µm, a D50 of about 0.5 µm to about 200 µm, and a D90 of about 3 µm to about 300 µm, wherein D10<D50<D90; Element 26: wherein the OACTP particles have a diameter span of about 0.2 to about 10; Element 27: wherein the OACTP particles have a D10 of about 5 µm to about 30 µm, a D50 of about 30 µm to about 70 µm, and a D90 of about 70 µm to about 120 µm, wherein D10<D50<D90; Element 28: wherein the OACTP particles have a diameter span of about 1.0 to about 2.5; Element 29: wherein the OACTP particles have a D10 of about 25 µm to about 60 µm, a D50 of about 60 µm to about 110 µm, and a D90 of about 110 µm to about 175 µm, wherein D10<D50<D90; Element 30: wherein the OACTP particles have a diameter span of about 0.6 to about 1.5; Element 31: wherein the OACTP particles have a D10 of about 75 µm to about 125 µm, a D50 of about 100 µm to about 200 µm, and a D90 of about 125 µm to about 300 µm, wherein D10<D50<D90; Element 32: wherein the OACTP particles have a diameter span of about 0.2 to about 1.2; Element 33: wherein the OACTP particles have a circularity of about 0.90 to about 1.0; Element 34: wherein the OACTP particles have a Hausner ratio of about 1.0 to about 1.5; Element 35: wherein the emulsion stabilizer is included in the mixture and comprise nanoparticles, and wherein the nanoparticles comprise oxide nanoparticles; Element 36: wherein the emulsion stabilizer is included in the mixture and comprise nanoparticles, and wherein the nanoparticles comprise carbon black; and Element 37: wherein the emulsion stabilizer is included in the mixture and comprise nanoparticles, and wherein the nanoparticles comprise polymer nanoparticles. Examples of combinations include, but are not limited to, Element 1 in combination with one or more of Elements 2-37; two or more of Elements 2-4 in combination and optionally in further combination with one or more of Elements 5-37; two or more of Elements 7-10 in combination; two or more of Elements 18-21 in combination; Elements 25 and 26 in combination; Elements 27 and 28 in combination; Elements 29 and 30 in combination; Elements 31 and 32 in combination; one or more of Elements 25-32 in combination with Element 34 and/or Element 35; two or more of Elements 35-37 in combination; two or more of Elements 17, 24, 35, 36, and 37 in combination.

A third nonlimiting example embodiment is a composition comprising: optical absorber-containing thermoplastic polymer particles (OACTP particles) comprising a thermoplastic polymer and an optical absorber non-covalently bound to the thermoplastic polymer, wherein the particles have a circularity of about 0.90 to about 1.0. The third example embodiment may optionally include one or more of: Element 1; Element 2; Element 6; Element 25; Element 26; Element 27; Element 28; Element 29; Element 30; Element 31; Element 32; Element 33; Element 34; Element 35; Element 38: wherein the OACTP particles further comprise an emulsion stabilizer associated with an outer surface of the OACTP particles; Element 39: wherein the OACTP particles further comprise an emulsion stabilizer, and wherein at least some of the OACTP particles have a void comprising the emulsion stabilizer at a void/polymer interface; Element 40: Element 39 and wherein the emulsion stabilizer comprises nanoparticles and the nanoparticles are embedded in the void/polymer interface; Element 41: Element 39 and wherein the void contains a carrier fluid; and Element 42: wherein the OACTP particles further comprises elongated structures on the surface of the OACTP particles, wherein the elongated structures comprises the thermoplastic polymer with the emulsion stabilizer associated with an outer surface of the elongated structures.

Clauses

Clause 1. A method comprising: mixing a mixture comprising a thermoplastic polymer, an carrier fluid that is immiscible with the thermoplastic polymer, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising the thermoplastic polymer;

separating the solidified particles from the carrier fluid; and exposing the solidified particles to an optical absorber to produce optical absorber-containing thermoplastic polymer particles (OACTP particles).

Clause 2. The method of Clause 1, wherein the optical absorber is a first optical absorber, and wherein the mixture further comprises a second optical absorber.

Clause 3. The method of Clause 2, wherein the first and second optical absorbers are different.

Clause 4. The method of Clause 1, wherein the OACTP particles comprise 0.01 wt % to 30 wt % of the optical absorber based on the weight of the thermoplastic polymer in the OACTP particles.

Clause 5. The method of Clause 1, wherein the optical absorber is selected from the group consisting of: rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, indigo dyes, thioindigo dyes, perinone dyes, perylene dyes, isoindolene dyes, aromatic amino acids, flavins, derivatives of pyridoxyl, derivatives of chlorophyll, any combination thereof.

Clause 6. The method of Clause 1, wherein the emulsion stabilizer is included in the mixture, and wherein the emulsion stabilizer comprises a surfactant and/or a nanoparticle.

Clause 7. The method of Clause 6, wherein the emulsion stabilizer associated with an outer surface of the OACTP particles.

Clause 8. The method of Clause 7, wherein the emulsion stabilizer is embedded in the outer surface.

Clause 9. The method of Clause 1, wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Clause 10. The method of Clause 1, wherein at least some of the OACTP particles have a void comprising the emulsion stabilizer at a void/polymer interface.

Clause 11. The method of Clause 10, wherein the emulsion stabilizer is included in the mixture, and wherein the emulsion stabilizer comprises nanoparticles and the nanoparticles are embedded in the void/polymer interface.

Clause 12. The method of Clause 10, wherein the void contains the carrier fluid.

Clause 13. The method of Clause 1, wherein the OACTP particles further comprises elongated structures on the surface of the OACTP particles, wherein the elongated structures comprises the thermoplastic polymer and, when included, the emulsion stabilizer associated with an outer surface of the elongated structures.

Clause 14. The method of Clause 1, wherein the emulsion stabilizer is included in the mixture, and wherein the emulsion stabilizer is present and forms a coating that covers less than 5% of the surface of the OACTP particles.

Clause 15. The method of Clause 1, wherein the emulsion stabilizer is included in the mixture, and wherein the emulsion stabilizer is present and forms a coating that covers at least 5% of the surface of the OACTP particles.

Clause 16. The method of Clause 1, wherein the emulsion stabilizer is included in the mixture, and wherein the emulsion stabilizer is present and forms a coating that covers at least 25% of the surface of the OACTP particles.

Clause 17. The method of Clause 1, wherein the emulsion stabilizer is included in the mixture, and wherein the emulsion stabilizer is present and forms a coating that covers at least 50% of the surface of the OACTP particles.

Clause 18. The method of Clause 1, wherein the thermoplastic polymer is present in the mixture at 5 wt % to 60 wt % of the mixture.

Clause 19. The method of Clause 1, wherein the emulsion stabilizer is included in the mixture, and wherein the emulsion stabilizer is present in the mixture at 0.05 wt % to 5 wt % by weight of the thermoplastic polymer.

Clause 20. The method of Clause 1, wherein the emulsion stabilizer is included in the mixture, and wherein emulsion stabilizer comprises nanoparticles having an average diameter of 1 nm to 500 nm.

Clause 21. The method of Clause 1, wherein the carrier fluid is selected from the group consisting of: silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 22. The method of Clause 21, wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof.

Clause 23. The method of Clause 1, wherein the carrier fluid has a viscosity at 25° C. of 1,000 cSt to 150,000 cSt.

Clause 24. The method of Clause 1, wherein the carrier fluid has a density of 0.6 g/cm$^3$ to 1.5 g/cm$^3$.

Clause 25. The method of Clause 1, wherein mixing occurs in an extruder.

Clause 26. The method of Clause 1, wherein mixing occurs in a stirred reactor.

Clause 27. The method of Clause 1, wherein the emulsion stabilizer comprises a surfactant.

Clause 28. The method of Clause 1, wherein the OACTP particles have a D10 of about 0.1 μm to about 125 μm, a D50 of about 0.5 μm to about 200 μm, and a D90 of about 3 μm to about 300 μm, wherein D10<D50<D90.

Clause 29. The method of Clause 1, wherein the OACTP particles have a diameter span of about 0.2 to about 10.

Clause 30. The method of Clause 1, wherein the OACTP particles have a D10 of about 5 μm to about 30 μm, a D50 of about 30 μm to about 70 μm, and a D90 of about 70 μm to about 120 μm, wherein D10<D50<D90.

Clause 31. The method of Clause 30, wherein the OACTP particles have a diameter span of about 1.0 to about 2.5.

Clause 32. The method of Clause 1, wherein the OACTP particles have a D10 of about 25 μm to about 60 μm, a D50 of about 60 μm to about 110 μm, and a D90 of about 110 μm to about 175 μm, wherein D10<D50<D90.

Clause 33. The method of Clause 32, wherein the OACTP particles have a diameter span of about 0.6 to about 1.5.

Clause 34. The method of Clause 1, wherein the OACTP particles have a D10 of about 75 μm to about 125 μm, a D50 of about 100 μm to about 200 μm, and a D90 of about 125 μm to about 300 μm, wherein D10<D50<D90.

Clause 35. The method of Clause 34, wherein the OACTP particles have a diameter span of about 0.2 to about 1.2.

Clause 36. The method of Clause 1, wherein the OACTP particles have a circularity of about 0.90 to about 1.0.

Clause 37. The method of Clause 1, wherein the OACTP particles have a Hausner ratio of about 1.0 to about 1.5.

Clause 38. The method of Clause 1, wherein the emulsion stabilizer is included in the mixture and comprise nanoparticles, and wherein the nanoparticles comprise oxide nanoparticles.

Clause 39. The method of Clause 1, wherein the emulsion stabilizer is included in the mixture and comprise nanoparticles, and wherein the nanoparticles comprise carbon black.

Clause 40. The method of Clause 1, wherein the emulsion stabilizer is included in the mixture and comprise nanoparticles, and wherein the nanoparticles comprise polymer nanoparticles.

Clause 41. A composition comprising: optical absorber-containing thermoplastic polymer particles (OACTP particles) comprising a thermoplastic polymer and an optical absorber non-covalently bound to the thermoplastic polymer, wherein the particles have a circularity of about 0.90 to about 1.0.

Clause 42. The composition of Clause 41, wherein the OACTP particles comprise 0.01 wt % to 30 wt % of the optical absorber based on the weight of the thermoplastic polymer in the OACTP particles.

Clause 43. The composition of Clause 41, wherein the optical absorber is from a family selected from the group consisting of: rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, indigo dyes, thioindigo dyes, perinone dyes, perylene dyes, isoindolene dyes, aromatic amino acids, flavins, derivatives of pyridoxyl, derivatives of chlorophyll, and any combination thereof.

Clause 44. The composition of Clause 41, wherein the OACTP particles further comprise an emulsion stabilizer associated with an outer surface of the OACTP particles.

Clause 45. The composition of Clause 41, wherein the OACTP particles further comprise an emulsion stabilizer, and wherein at least some of the OACTP particles have a void comprising the emulsion stabilizer at a void/polymer interface.

Clause 46. The composition of Clause 45, wherein the emulsion stabilizer comprises nanoparticles and the nanoparticles are embedded in the void/polymer interface.

Clause 47. The composition of Clause 45, wherein the void contains a carrier fluid.

Clause 48. The composition of Clause 44, wherein the OACTP particles further comprises elongated structures on the surface of the OACTP particles, wherein the elongated structures comprises the thermoplastic polymer with the emulsion stabilizer associated with an outer surface of the elongated structures.

Clause 49. The composition of Clause 44, wherein the emulsion stabilizer forms a coating that covers less than 5% of the surface of the OACTP particles.

Clause 50. The composition of Clause 44, wherein the emulsion stabilizer forms a coating that covers at least 5% of the surface of the OACTP particles.

Clause 51. The composition of Clause 44, wherein the emulsion stabilizer forms a coating that covers at least 25% of the surface of the OACTP particles.

Clause 52. The composition of Clause 44, wherein the emulsion stabilizer forms a coating that covers at least 50% of the surface of the OACTP particles.

Clause 53. The composition of Clause 44, wherein the emulsion stabilizer comprises nanoparticles having an average diameter of 1 nm to 500 nm.

Clause 54. The composition of Clause 41, wherein the OACTP particles have a D10 of about 0.1 μm to about 125 μm, a D50 of about 0.5 μm to about 200 μm, and a D90 of about 3 μm to about 300 μm, wherein D10<D50<D90.

Clause 55. The composition of Clause 41, wherein the OACTP particles have a diameter span of about 0.2 to about 10.

Clause 56. The composition of Clause 41, wherein the OACTP particles have a D10 of about 5 μm to about 30 μm, a D50 of about 30 μm to about 70 μm, and a D90 of about 70 μm to about 120 μm, wherein D10<D50<D90.

Clause 57. The composition of Clause 56, wherein the OACTP particles have a diameter span of about 1.0 to about 2.5.

Clause 58. The composition of Clause 41, wherein the OACTP particles have a D10 of about 25 μm to about 60 μm, a D50 of about 60 μm to about 110 μm, and a D90 of about 110 μm to about 175 μm, wherein D10<D50<D90.

Clause 59. The composition of Clause 58, wherein the OACTP particles have a diameter span of about 0.6 to about 1.5.

Clause 60. The composition of Clause 41, wherein the OACTP particles have a D10 of about 75 μm to about 125

µm, a D50 of about 100 µm to about 200 µm, and a D90 of about 125 µm to about 300 µm, wherein D10<D50<D90.

Clause 61. The composition of Clause 60, wherein the OACTP particles have a diameter span of about 0.2 to about 1.2.

Clause 62. The composition of Clause 41, wherein the OACTP particles have a Hausner ratio of about 1.0 to about 1.5.

Clause 63. A method comprising: depositing OACTP particles of any of Clauses 41-62 optionally in combination with other thermoplastic polymer particles upon a surface in a specified shape; and once deposited, heating at least a portion of the particles to promote consolidation thereof and form a consolidated body.

Clause 64. A method comprising: mixing a mixture comprising a thermoplastic polymer, an carrier fluid that is immiscible with the thermoplastic polymer, an optical absorber, and optionally an emulsion stabilizer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form a solidified optical absorber containing thermoplastic polymer particles (OACTP particles) comprising the thermoplastic polymer and the optical absorber; and separating the solidified OACTP particles from the carrier fluid.

Clause 65. The method of Clause 64, wherein the OACTP particles comprise 0.01 wt % to 30 wt % of the optical absorber based on the weight of the thermoplastic polymer in the OACTP particles.

Clause 66. The method of Clause 64, wherein the optical absorber is selected from the group consisting of: rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, indigo dyes, thioindigo dyes, perinone dyes, perylene dyes, isoindolene dyes, aromatic amino acids, flavins, derivatives of pyridoxyl, derivatives of chlorophyll, any combination thereof.

Clause 67. The method of Clause 64, wherein the emulsion stabilizer is included in the mixture, and wherein the emulsion stabilizer comprises a surfactant and/or a nanoparticle.

Clause 68. The method of Clause 67, wherein the emulsion stabilizer is associated with an outer surface of the OACTP particles.

Clause 69. The method of Clause 68, wherein the emulsion stabilizer is embedded in the outer surface.

Clause 70. The method of Clause 64, wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Clause 71. The method of Clause 64, wherein at least some of the OACTP particles have a void comprising the emulsion stabilizer at a void/polymer interface.

Clause 72. The method of Clause 71, wherein the emulsion stabilizer is included in the mixture, and wherein the emulsion stabilizer comprises nanoparticles and the nanoparticles are embedded in the void/polymer interface.

Clause 73. The method of Clause 71, wherein the void contains the carrier fluid.

Clause 74. The method of Clause 64, wherein the OACTP particles further comprises elongated structures on the surface of the OACTP particles, wherein the elongated structures comprises the thermoplastic polymer and, when included, the emulsion stabilizer associated with an outer surface of the elongated structures.

Clause 75. The method of Clause 64, wherein the emulsion stabilizer is included in the mixture, and wherein the emulsion stabilizer is present and forms a coating that covers less than 5% of the surface of the OACTP particles.

Clause 76. The method of Clause 64, wherein the emulsion stabilizer is included in the mixture, and wherein the emulsion stabilizer is present and forms a coating that covers at least 5% of the surface of the OACTP particles.

Clause 77. The method of Clause 64, wherein the emulsion stabilizer is included in the mixture, and wherein the emulsion stabilizer is present and forms a coating that covers at least 25% of the surface of the OACTP particles.

Clause 78. The method of Clause 64, wherein the emulsion stabilizer is included in the mixture, and wherein the emulsion stabilizer is present and forms a coating that covers at least 50% of the surface of the OACTP particles.

Clause 79. The method of Clause 64, wherein the thermoplastic polymer is present in the mixture at 5 wt % to 60 wt % of the mixture.

Clause 80. The method of Clause 64, wherein the emulsion stabilizer is included in the mixture, and wherein the emulsion stabilizer is present in the mixture at 0.05 wt % to 5 wt % by weight of the thermoplastic polymer.

Clause 81. The method of Clause 64, wherein the emulsion stabilizer is included in the mixture, and wherein the emulsion stabilizer comprises nanoparticles having an average diameter of 1 nm to 500 nm.

Clause 82. The method of Clause 64, wherein the carrier fluid is selected from the group consisting of: silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 83. The method of Clause 82, wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof.

Clause 84. The method of Clause 64, wherein the carrier fluid has a viscosity at 25° C. of 1,000 cSt to 150,000 cSt.

Clause 85. The method of Clause 64, wherein the carrier fluid has a density of 0.6 g/cm$^3$ to 1.5 g/cm$^3$.

Clause 86. The method of Clause 64, wherein mixing occurs in an extruder.

Clause 87. The method of Clause 64, wherein mixing occurs in a stirred reactor.

Clause 88. The method of Clause 64, wherein the emulsion stabilizer is included and comprises a surfactant.

Clause 89. The method of Clause 64, wherein the OACTP particles have a D10 of about 0.1 µm to about 125 µm, a D50 of about 0.5 µm to about 200 µm, and a D90 of about 3 µm to about 300 µm, wherein D10<D50<D90.

Clause 90. The method of Clause 64, wherein the OACTP particles have a diameter span of about 0.2 to about 10.

Clause 91. The method of Clause 64, wherein the OACTP particles have a D10 of about 5 µm to about 30 µm, a D50 of about 30 µm to about 70 µm, and a D90 of about 70 µm to about 120 µm, wherein D10<D50<D90.

Clause 92. The method of Clause 91, wherein the OACTP particles have a diameter span of about 1.0 to about 2.5.

Clause 93. The method of Clause 64, wherein the OACTP particles have a D10 of about 25 µm to about 60 µm, a D50 of about 60 µm to about 110 µm, and a D90 of about 110 µm to about 175 µm, wherein D10<D50<D90.

Clause 94. The method of Clause 93, wherein the OACTP particles have a diameter span of about 0.6 to about 1.5.

Clause 95. The method of Clause 64, wherein the OACTP particles have a D10 of about 75 µm to about 125 µm, a D50 of about 100 µm to about 200 µm, and a D90 of about 125 µm to about 300 µm, wherein D10<D50<D90.

Clause 96. The method of Clause 96, wherein the OACTP particles have a diameter span of about 0.2 to about 1.2.

Clause 97. The method of Clause 64, wherein the OACTP particles have a circularity of about 0.90 to about 1.0.

Clause 98. The method of Clause 64, wherein the OACTP particles have a Hausner ratio of about 1.0 to about 1.5.

Clause 99. The method of Clause 64, wherein the emulsion stabilizer is included in the mixture and comprise nanoparticles, and wherein the nanoparticles comprise oxide nanoparticles.

Clause 100. The method of Clause 64, wherein the emulsion stabilizer is included in the mixture and comprise nanoparticles, and wherein the nanoparticles comprise carbon black.

Clause 101. The method of Clause 64, wherein the emulsion stabilizer is included in the mixture and comprise nanoparticles, and wherein the nanoparticles comprise polymer nanoparticles.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Example 1

Polyamide 12 microparticles were produced in a 25 mm twin-screw extruder (Werner & Pfleiderer ZSK-25). The carrier fluid was PDMS oil with 10,000 cSt viscosity at room temperature. The concentrations of components in the final mixture in the extruder are provided in Table 1. The polymer pellets were added to the extruder, brought to temperature, and then preheated carrier fluid having AEROSIL® R812S silica nanoparticles dispersed therein added to the molten polymer in the extruder. Other operational parameters are provided in Table 1. Then the mixture was discharged into a container and allowed to cool to room temperature over several hours. The light scattering particle size data is also provided in Table 1.

TABLE 1

| Sample | 2-1 | 2-2 | 2-3 | 2-4 | 2-5 | 2-6 |
|---|---|---|---|---|---|---|
| Screw RPM | 900 | 1100 | 1100 | 900 | 900 | 1100 |
| wt % polyamide 12* | 47 | 47 | 47 | 47 | 38 | 38 |

TABLE 1-continued

| Sample | 2-1 | 2-2 | 2-3 | 2-4 | 2-5 | 2-6 |
|---|---|---|---|---|---|---|
| wt % silica** | 1.1 | 1.1 | 1.1 | 1.1 | 1.1 | 1.1 |
| Temp. (° C.) | 230 | 230 | 250 | 250 | 230 | 230 |
| D10 (μm) | 30.5 | 31.2 | 26.2 | 25.4 | 35.6 | 54.2 |
| D50 (μm) | 57.8 | 50.3 | 38.1 | 38.5 | 72.8 | 111 |
| D90 (μm) | 101 | 80.1 | 55.3 | 57.9 | 131 | 220 |

*relative total combined weight of PDMS oil and polyamide
**relative to polyamide Example 2 (Prophetic)

Polyamide 12 microparticles of Table 1 or produced by other melt emulsification methods can be dispersed in methanol with a solids loading of approximately 20 wt % (20 g polyamide 12 microparticles in 80 g methanol). Once the particles are wetted, a solution of 0.2 wt % fluorescein in water can be added into the particle slurry and mixing can be continued at ambient temperature. In this example, heating should be avoided since it may result in a reduction in hydrogen bonding strength. After about 4 hours of mixing at 150 rpm (stir bar, beaker), the particles can be filtered from the methanol and dried in an oven at 40° C. overnight.

Without being limited by theory, it is believed that the amine groups of the polyamide 12 will hydrogen bond with various oxygen-containing groups of the fluorescein. Further, because the polyamide 12 is exposed to the fluorescein after formation of the polymer particles, it is believed that the fluorescein will be primarily at or near the surface of the polymer particles.

The fluorescence spectrum of the polyamide 12 microparticles can be measured by fluorescence microscopy exhibiting an emission maximum at 515 nm when excited at 495 nm, which is a typical fluorescence peak of a ring-opened form of fluorescein.

These fluorescein polyamide 12 microparticles can be printed by selective-layer-sintering and rechecked for fluorescence. The melting point and decomposition temperature of fluorescein is about 315° C. The sintering process will not reach this temperature thereby not comprising its fluorescent nature.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
   mixing a mixture comprising a thermoplastic polymer, a carrier fluid that is immiscible with the thermoplastic polymer, and an emulsion stabilizer at a temperature greater than a melting point or softening temperature of the thermoplastic polymer and at a shear rate sufficiently high to disperse the thermoplastic polymer in the carrier fluid, wherein the emulsion stabilizer comprises nanoparticles;
   cooling the mixture to below the melting point or softening temperature of the thermoplastic polymer to form solidified particles comprising the thermoplastic polymer;
   separating the solidified particles from the carrier fluid; and
   exposing the solidified particles to an optical absorber to produce optical absorber-containing thermoplastic polymer particles (OACTP particles).

2. The method of claim 1, wherein the optical absorber is a first optical absorber, and wherein the mixture further comprises a second optical absorber.

3. The method of claim 2, wherein the first and second optical absorbers are different.

4. The method of claim 1, wherein the OACTP particles comprise 0.01 wt % to 30 wt % of the optical absorber based on the weight of the thermoplastic polymer in the OACTP particles.

5. The method of claim 1, wherein the optical absorber is selected from the group consisting of rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, indigo dyes, thioindigo dyes, perinone dyes, perylene dyes, isoindolene dyes, aromatic amino acids, flavins, derivatives of pyridoxyl, derivatives of chlorophyll, any combination thereof.

6. The method of claim 1, wherein the emulsion stabilizer is associated with an outer surface of the OACTP particles.

7. The method of claim 6, wherein the emulsion stabilizer is embedded in the outer surface.

8. The method of claim 1, wherein the thermoplastic polymer is selected from the group consisting of polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters, polylactic acid, polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block, grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

9. The method of claim 1, wherein the OACTP particles have a D10 of about 0.1 μm to about 125 μm, a D50 of about 0.5 μm to about 200 μm, and a D90 of about 3 μm to about 300 μm, wherein D10<D50<D90.

10. The method of claim 1, wherein the OACTP particles have a diameter span of about 0.2 to about 10.

11. The method of claim 1, wherein the OACTP particles have a circularity of about 0.90 to about 1.0.

12. The method of claim 1, wherein the OACTP particles have a Hausner ratio of about 1.0 to about 1.5.

* * * * *